US012792074B2

(12) United States Patent
Bertolini et al.

(10) Patent No.: US 12,792,074 B2
(45) Date of Patent: Nov. 10, 2026

(54) ADAPTIVE DROPOUT FOR A LOW DROPOUT (LDO) REGULATOR CIRCUIT

(71) Applicant: STMicroelectronics International N.V., Geneva (CH)

(72) Inventors: Alessandro Bertolini, Vermiglio (IT); Lorenzo Cremonesi, Sant'Angelo Lodigiano (IT); Alessandro Gasparini, Cusano Milanino (IT)

(73) Assignee: STMicroelectronics International N.V., Geneva (CH)

(*) Notice: Subject to any disclaimer, the term of this patent is extended or adjusted under 35 U.S.C. 154(b) by 154 days.

(21) Appl. No.: 18/953,311

(22) Filed: Nov. 20, 2024

(65) Prior Publication Data

US 2026/0140525 A1 May 21, 2026

(51) Int. Cl.

| | |
|---|---|
| ***G05F 1/575*** | (2006.01) |
| ***G05F 1/56*** | (2006.01) |
| ***H02M 1/00*** | (2006.01) |

(52) U.S. Cl.

CPC .............. *G05F 1/575* (2013.01); *G05F 1/561* (2013.01); *H02M 1/0025* (2021.05); *H02M 1/0045* (2021.05); *H02M 1/007* (2021.05); *H02M 1/0095* (2021.05)

(58) Field of Classification Search

CPC ...... G05F 1/575; G05F 1/561; H02M 1/0025; H02M 1/0045; H02M 1/007; H02M 1/0095

See application file for complete search history.

(56) References Cited

U.S. PATENT DOCUMENTS

| | | | | |
|---|---|---|---|---|
| 8,866,460 | B2 * | 10/2014 | Huang | G05F 1/46 323/283 |
| 9,753,470 | B1 * | 9/2017 | Hawley | G05F 1/462 |
| 2006/0033481 | A1 | 2/2006 | Thiele et al. | |
| 2018/0120879 | A1 | 5/2018 | Du et al. | |
| 2018/0129234 | A1 * | 5/2018 | Melgar | G05F 1/575 |
| 2018/0136680 | A1 | 5/2018 | Du et al. | |
| 2018/0196454 | A1 | 7/2018 | Ivanov et al. | |
| 2021/0278868 | A1 | 9/2021 | Cuenca et al. | |
| 2023/0216405 | A1 | 7/2023 | Barbieri et al. | |
| 2026/0104724 | A1 * | 4/2026 | Sharifi | G05F 1/575 |

* cited by examiner

*Primary Examiner* — Monica Lewis
*Assistant Examiner* — Jye-June Lee
(74) *Attorney, Agent, or Firm* — Crowe & Dunlevy LLC

(57) ABSTRACT

A DC-DC converter circuit receives a supply voltage and an adjustable first reference voltage to generate a DC supply voltage as a function of the adjustable first reference voltage. A LDO regulator circuit receives the DC supply voltage to generate a regulated output voltage. A power transistor of the LDO regulator circuit has drain where the regulated output voltage is generated and a gate controlled by a gate voltage. A headroom control circuit generates the adjustable first reference voltage using a scaled replica of the power transistor in a trans-diode configuration having a source coupled to a drain of the power transistor. A resistor is connected to a drain of the scaled replica transistor and biased to generate a gate reference voltage. A reference voltage generator circuit generates the adjustable first reference voltage as a function of a difference between the gate voltage and the gate reference voltage.

18 Claims, 7 Drawing Sheets

ADAPTIVE DROPOUT FOR A LOW DROPOUT (LDO) REGULATOR CIRCUIT

TECHNICAL FIELD

The present invention generally relates to a low dropout (LDO) regulator circuit and, more particularly, to a circuit configured to track LDO regulator circuit operating condition and dynamically control headroom.

BACKGROUND

It is known in the art to cascade a low dropout (LDO) regulator circuit to receive a supply voltage from a voltage regulator, such as DC-DC converter circuit, as shown in FIG. 1. This is referred to in the art as a tandem LDO circuit. The DC-DC converter circuit may, for example, comprise a buck-boost type DC-DC converter. The output of the LDO regulator circuit may supply power to any load. In a particular application of interest, the output of the LDO regulator circuit is coupled to an organic light emitting diode (OLED) display panel.

SUMMARY

In an embodiment, a circuit comprises: a voltage regulator circuit receiving a supply voltage and an adjustable control signal to generate a DC supply voltage from the supply voltage as a function of the adjustable control signal; a low dropout (LDO) regulator circuit receiving the DC supply voltage and a first reference voltage to generate a regulated output voltage from the DC supply voltage as a function of the first reference voltage; wherein the LDO regulator circuit includes a power transistor having drain where the regulated output voltage is generated and a gate that receives a gate voltage; and a headroom control circuit.

The headroom control circuit comprises: a replica transistor in a trans-diode configuration, wherein the replica transistor is a scaled replica of the power transistor, the replica transistor having a source coupled to a drain of the power transistor; a resistor connected to a drain of the replica transistor and biased by a bias current to generate a gate reference voltage; and a control signal generator circuit configured to generate the adjustable control signal as a function of a difference between the gate voltage and the gate reference voltage.

In an embodiment, the voltage regulator circuit may comprise a DC-DC converter circuit, an AC-DC converter circuit, a charge pump circuit, or a linear regulator circuit (as examples).

In an embodiment, the adjustable control signal is an adjustable second reference voltage for the voltage regulator circuit and the control signal generator circuit comprises: an error amplifier having a first input configured to receive the gate voltage and a second input configured to receive the gate reference voltage; a voltage-to-current converter circuit configured to convert a difference voltage at an output of the error amplifier to a difference current; and an operational amplifier circuit having a first input configured to receive a fixed voltage, a second input configured to receive the difference current and a feedback resistor coupled between the second input and an output of the operational amplifier circuit where the adjustable second reference voltage is generated.

In an embodiment, the adjustable control signal is an adjustable current applied to a feedback loop of the voltage regulator circuit and the control signal generator circuit comprises: an error amplifier having a first input configured to receive the gate voltage and a second input configured to receive the gate reference voltage; and a voltage-to-current converter circuit configured to convert a difference voltage at an output of the error amplifier to a difference current which is applied as the adjustable current for the adjustable control signal.

In an embodiment, a circuit comprises: a voltage regulator circuit receiving a supply voltage and an adjustable control signal to generate a DC supply voltage from the supply voltage as a function of the adjustable control signal; a low dropout (LDO) regulator circuit receiving the DC supply voltage and a first reference voltage to generate a regulated output voltage from the DC supply voltage as a function of the first reference voltage; wherein the LDO regulator circuit includes a power transistor having drain where the regulated output voltage is generated and a gate that receives a gate voltage; and a headroom control circuit including a gate reference tracking circuit configured to generate from the regulated output voltage of the LDO regulator circuit a reference gate voltage for the power transistor and an adjustment circuit configured to compare the gate voltage to the reference gate voltage and generate the adjustable control signal a function of a difference between the gate voltage and the gate reference voltage.

The adjustable control signal may comprise one of: an adjustable second reference voltage for the voltage regulator circuit or an adjustable current applied to a feedback loop of the voltage regulator circuit.

BRIEF DESCRIPTION OF THE DRAWINGS

For a better understanding of the embodiments, reference will now be made by way of example only to the accompanying figures in which.

DETAILED DESCRIPTION

Figure 1:
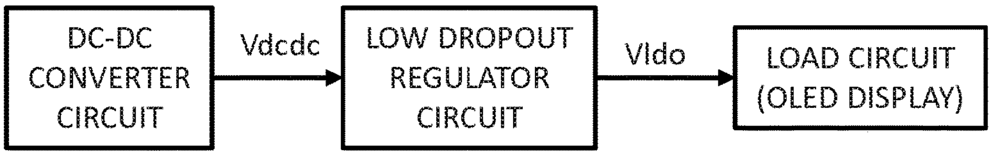
FIG. 1 (Prior Art)
FIG. 1 shows a block diagram of a system including a DC-DC converter, a low dropout (LDO) regulator and a load.
Figure 2:
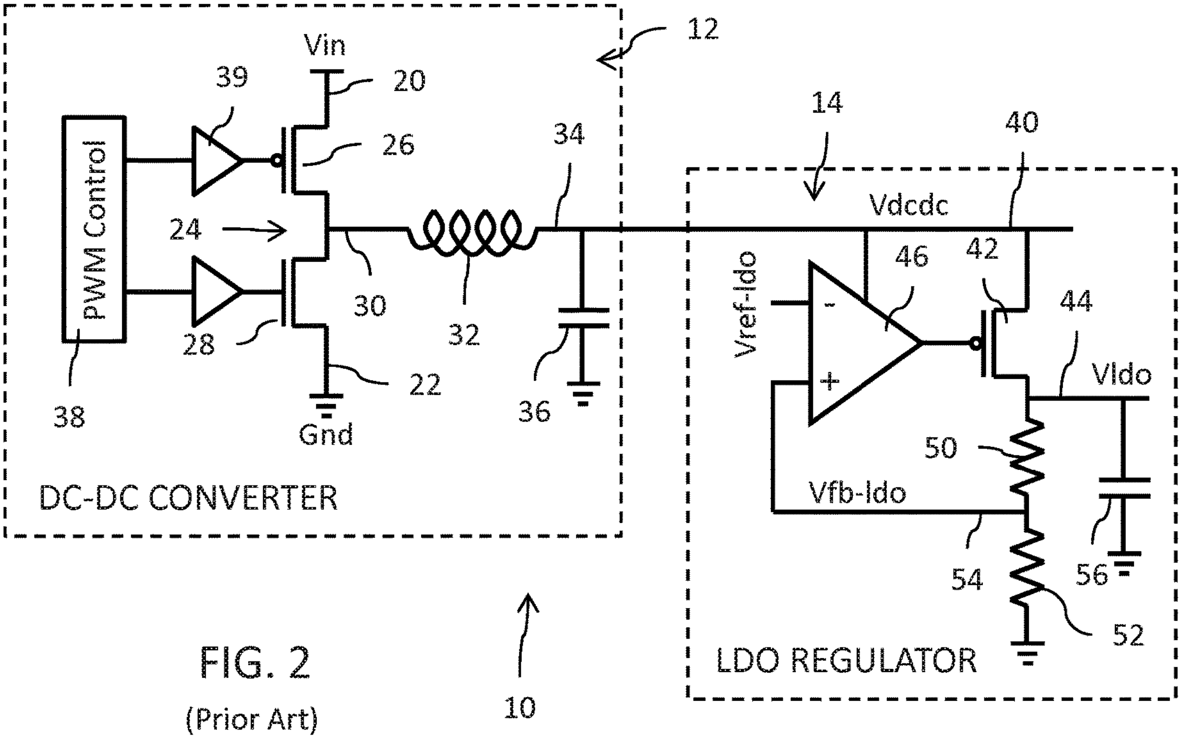
FIG. 2 (Prior Art)
FIG. 2 shows a circuit diagram for a tandem LDO circuit including a DC-DC-converter circuit and an LDO regulator circuit.

Reference is now made to FIG. 2 which shows a circuit diagram for a tandem LDO circuit 10 including a DC-DC converter circuit 12 and an LDO regulator circuit 14.

The DC-DC converter circuit 12 receives an input voltage Vin between a first power supply node 20 and a second power supply node 22 (providing a ground Gnd reference). A half-bridge circuit 24 is coupled between node 20 and node 22. The half-bridge circuit 24 is formed by the series connection of a high side (HS) transistor switch 26 and a low side (LS) transistor switch 28. In an embodiment, the switches 26, 28 are metal oxide semiconductor field effect transistor (MOSFET) devices. The MOSFET for switch 26 may be implemented as a p-channel MOS transistor and the MOSFET for switch 28 may be implemented as an n-channel MOS transistor. Alternatively, the transistors for switches 26 and 28 can have a same, for example n-channel, conductivity type. The drain terminals of transistors 26 and 28 are coupled, preferably connected, to an intermediate switching node 30. The source terminal of transistor 26 is coupled, preferably connected, to the power supply node 20, and the source terminal of transistor 28 is coupled, preferably connected, to the power supply node 22. A first terminal of an inductor 32 is coupled, preferably connected, to the intermediate switching node 30 and a second terminal of the inductor 32 is coupled, preferably connected, to an output node 34 of the DC-DC converter circuit 12. A capacitor 36 is coupled, preferably connected, between the output node 34 and the second power supply node 22. The gate terminals of the transistors 26 and 28 in the half-bridge circuit 24 are driven by high side and low side drive signals, respectively, having a pulse width modulation (PWM) generated by a control circuit 38 and amplified by driver circuits 39. The DC-DC converter circuit 12 operates in a manner well-known to those skilled in the art to control the switching operation of the transistors 26 and 28 in the half-bridge circuit 24 to control the on time (Ton) and off time (Toff) of the transistors 26 and 28 to deliver current to and output current from the inductor 32 for converting the input voltage Vin to an output voltage Vdcdc at output node 34 stored across the capacitor 36.

The LDO regulator circuit 14 receives, as a supply voltage, the voltage Vdcdc output from the DC-DC converter circuit 12 between a supply node 40 (corresponding to output node 34) and the reference node 22. A power transistor 42 has a first conduction terminal coupled, preferably connected, to the node 40 and a second conduction terminal coupled, preferably connected, to an output node 44. In an embodiment, the power transistor 42 is a metal oxide semiconductor field effect transistor (MOSFET) device. The MOSFET for power transistor 42 is shown, by example only, as a p-channel MOS transistor with a source (first conduction) terminal connected to the node 40 and a drain (second conduction) terminal connected to node 44. The gate terminal of transistor 42 is driven by the output of a differential amplifier 46 (for example, comprising an operational amplifier (OP-AMP) configured as an error amplifier) powered by the voltage Vdcdc. A first, inverting, input of the amplifier 46 is coupled to receive a reference voltage Vref-ldo (generated, for example, using a band-gap circuit). A second, non-inverting, input of the amplifier 46 is coupled to receive a feedback voltage Vfb-ldo derived from an output voltage Vldo generated at the output node 44. The feedback voltage Vfb-ldo is generated by a resistive voltage divider circuit formed by the series connection of resistors 50 and 52 which are coupled, preferably connected, between the output node 44 and the reference node 20. The feedback voltage Vfb-ldo is output at the series connection node 54 between resistors 50 and 52. A capacitor 56 is coupled, preferably connected, between the output node 44 and the second power supply node 22. The LDO regulator circuit 14 operates in a manner well-known to those skilled in the art to control the conductivity of the transistor 42 for delivering current to the output node and regulate the output voltage Vldo at a level dependent on the reference voltage Vref-ldo.

The performance of the LDO regulator circuit 14 is heavily affected by operating region of the power transistor 42. Whenever the power transistor 42 operates in the ohmic region there is a loop gain drop that leads to degradation of the power supply rejection (PSR). The key parameter which sets the operating region of the power transistor 42 is the headroom provided by the voltage Vdcdc output from the DC-DC converter circuit 12. This is strictly related to the current provided by the LDO regulator circuit 14 at the output node 44.

The expression for the output current $I_{LDO}$ provided by the LDO regulator circuit 14 when the power transistor 42 is operating in the saturation region is given by:

$$I_{LDO} = \frac{1}{2} k\mu \frac{W}{L} V_{OV}^2$$

Where W and L are the width and length, respectively, of the power transistor 42, k is Boltzmans constant, μ is mobility, and $V_{OV}$ is the overdrive voltage which is equal to the difference between the gate to source voltage Vgs and the threshold voltage Vth of the power transistor 42.

The saturation condition is applicable when the headroom voltage $V_{HEADROOM}$ is greater than or equal to the voltage $V_{OV}$.

The efficiency of the LDO regulator circuit 14 is given by:

$$\eta_{LDO} \cong \frac{V_{LDO}}{V_{DCDC}} = \frac{V_{LDO}}{V_{LDO} + V_{HEADROOM}}$$

One way to maintain the power transistor 42 operating in the saturation region is to set a fixed headroom voltage $V_{HEADROOM}$ determined by a maximum output current. A certain maximum overdrive voltage is needed to carry the maximum output current:

$$V_{OV}^{MAX} = \sqrt{\frac{2 I_{LDO,MAX}}{k\mu\left(\frac{W}{L}\right)}}$$

This represents the overdrive necessary to carry the maximum output current, where:

$$V_{HEADROOM} \geq V_{OV}^{MAX}$$

will satisfy the saturation condition.

A concern with this solution designed for the maximum output current is that it leads to a useless waste of efficiency whenever the LDO regulator circuit 14 outputs a current that is less than the maximum current, as shown by the efficiency equation:

$$\eta_{LDO} = \frac{V_{LDO}}{V_{LDO} + V_{OV}^{MAX}}$$

Figure 3A:
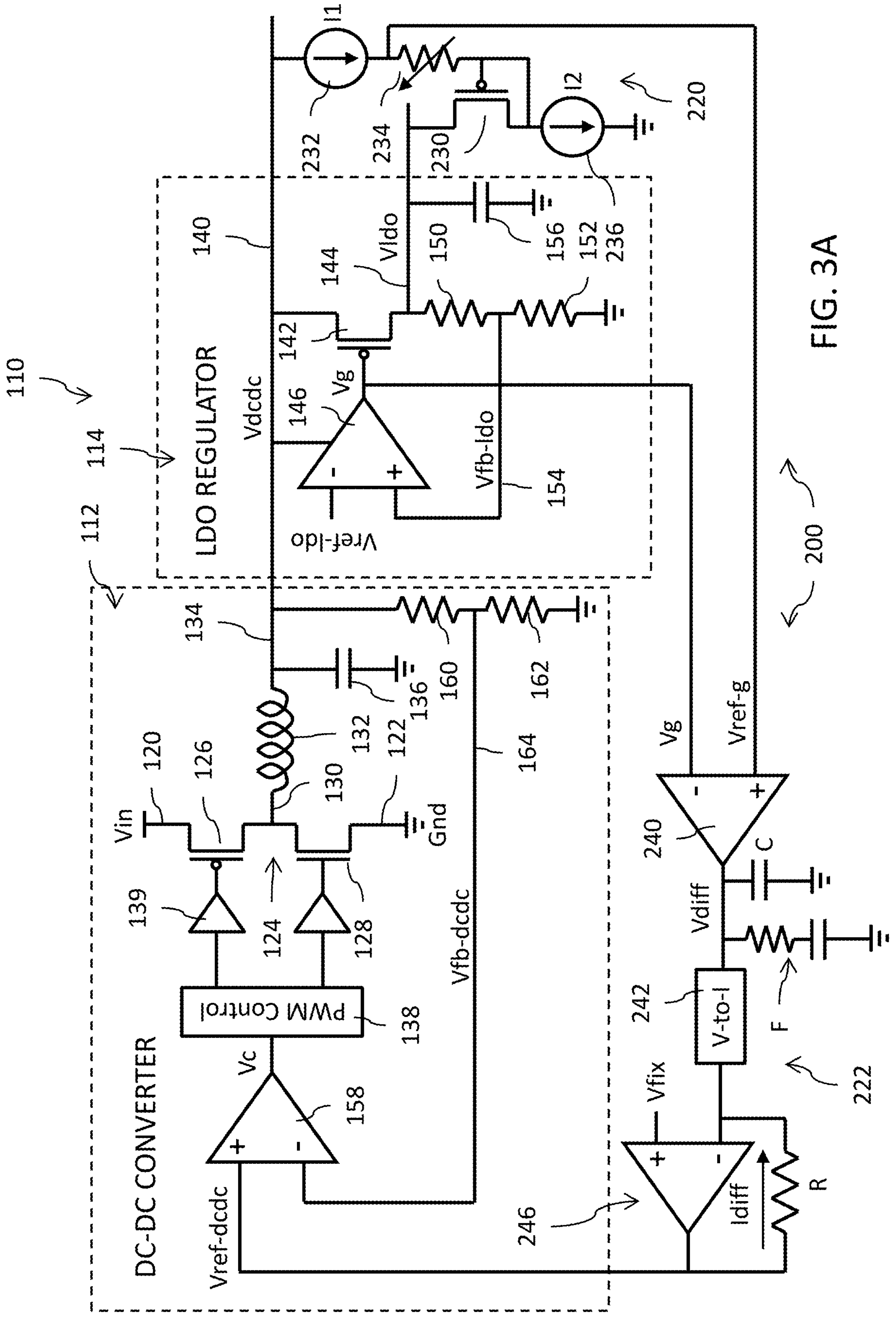
FIGS. 3A-3D show circuit diagrams for embodiments of a tandem LDO circuit including a voltage regulator circuit, a p-channel power MOSFET based LDO regulator circuit and a headroom control circuit.

Reference is now made to FIG. 3A which shows a circuit diagram for a tandem LDO circuit 110 including a voltage regulator circuit (shown here, by example only, as a DC-DC converter circuit 112), an LDO regulator circuit 114 and a headroom control circuit 200.

The DC-DC converter circuit 112 receives an input voltage Vin between a first power supply node 120 and a second power supply node 122 (providing a ground Gnd reference). A half-bridge circuit 124 is coupled between node 120 and node 122. The half-bridge circuit 124 is formed by the series connection of a high side (HS) transistor switch 126 and a low side (LS) transistor switch 128. In an embodiment, the switches 126, 128 are metal oxide semiconductor field effect transistor (MOSFET) devices. The MOSFET for switch 126 may be implemented as a p-channel MOS transistor and the MOSFET for switch 128 may be implemented as an n-channel MOS transistor. Alternatively, the transistors for switches 126 and 128 can have a same, for example n-channel, conductivity type. The drain terminals of transistors 126 and 128 are coupled, preferably connected, to an intermediate switching node 130. The source terminal of transistor 126 is coupled, preferably connected, to the power supply node 120, and the source terminal of transistor 128 is coupled, preferably connected, to the power supply node 122. A first terminal of an inductor 132 is coupled, preferably connected, to the intermediate switching node 130 and a second terminal of the inductor 132 is coupled, preferably connected, to an output node 134 of the DC-DC converter circuit 112. A capacitor 136 is coupled, preferably connected, between the output node 134 and the second power supply node 122. The gate terminals of the transistors 126 and 128 in the half-bridge circuit 124 are driven by high side and low side drive signals, respectively, having a pulse width modulation (PWM) generated by a control circuit 138 and amplified by driver circuits 139. A control voltage Vc for controlling PWM signal generation by the PWM control circuit 140 is generated by a differential amplifier 158 (for example, comprising an operational amplifier (OP-AMP) configured as an error amplifier). A first, inverting, input of the amplifier 158 is coupled to receive a tunable or adjustable reference voltage Vref-dcdc (generated by the headroom control circuit 200 as described in detail below). A second, non-inverting, input of the amplifier 158 is coupled to receive a feedback voltage Vfb-dcdc derived from the output voltage Vdcdc at the output node 134. The control voltage Vc is derived from a difference (i.e., error) between the reference voltage Vref-dcdc and the feedback voltage Vfb-dcdc. The feedback voltage Vfb-dcdc is generated by a resistive voltage divider circuit formed by the series connection of resistors 160 and 162 which are coupled, preferably connected, between the output node 134 and the reference node 120. The feedback voltage Vfb-dcdc is output at the series connection node 164 between resistors 160 and 162. The DC-DC converter circuit 112 operates in a manner well-known to those skilled in the art to control the switching operation of the transistors 126 and 128 in the half-bridge circuit 124 to control the on time (Ton) and off time (Toff) of the transistors 126 and 128 to deliver current to and output current from the inductor 132 for converting the input voltage Vin to an output voltage Vdcdc stored across the capacitor 136 dependent on the error difference between the reference voltage Vref-dcdc and the feedback voltage Vfb-dcdc.

The LDO regulator circuit 114 receives the voltage Vdcdc output from the DC-DC converter circuit 112, as a supply voltage, between a supply node 140 (corresponding to output node 134) and the reference node 122. A power transistor 142 has a first conduction terminal coupled, preferably connected, to the node 140 and a second conduction terminal coupled, preferably connected, to an output node 144. In an embodiment, the power transistor 142 is a metal oxide semiconductor field effect transistor (MOSFET) device. The MOSFET for power transistor 142 is shown, by example only, as a p-channel MOS transistor with a source (first conduction) terminal connected to the node 140 and a drain (second conduction) terminal connected to node 144. The gate terminal of transistor 142 is driven by the output of a differential amplifier 146 (for example, comprising an operational amplifier (OP-AMP) configured as an error amplifier) powered by the voltage Vdcdc. A first, inverting, input of the amplifier 146 is coupled to receive a reference voltage Vref-ldo (generated, for example, using a band-gap circuit). A second, non-inverting, input of the amplifier 146 is coupled to receive a feedback voltage Vfb-ldo derived from an output voltage Vldo at the output node 144. The differential amplifier 146 generates at its output a gate control voltage Vg derived from a difference (i.e., error) between the reference voltage Vref-ldo and the feedback voltage Vfb-ldo. The feedback voltage Vfb-ldo is generated by a resistive voltage divider circuit formed by the series connection of resistors 150 and 152 which are coupled, preferably connected, between the output node 144 and the reference node 120. The feedback voltage Vfb-ldo is output at the series connection node 154 between resistors 150 and 152. A capacitor 156 is coupled, preferably connected, between the output node 144 and the second power supply node 122. The LDO regulator circuit 114 operates in a manner well-known to those skilled in the art to control the conductivity of the transistor 142 and regulate the output voltage Vldo at a level dependent on the error difference between the reference voltage Vref-ldo and the feedback voltage Vfb-ldo.

The headroom control circuit 200 includes a gate reference tracking circuit 220 and a DC-DC converter reference voltage Vref-dcdc generating circuit 222. The gate reference tracking circuit 220 is coupled to the power transistor 142 to receive its drain voltage for tracking the saturation condition of the power transistor 142 and generating a power transistor gate reference voltage Vref-g. Specifically, the gate reference tracking circuit 220 operates in open-loop condition to reconstruct a desired (i.e., target or reference) gate voltage Vref-g for the power transistor 142 that is tracked no matter the process, voltage and temperature (PVT) condition, the output load condition, and/or the output voltage condition. The power transistor gate reference voltage Vref-g and the actual gate control voltage Vg of the power transistor 142 are fed as inputs to the reference voltage Vref-dcdc generating circuit 222 which determines an error difference between those voltages and adjusts (or tunes) the DC-DC converter reference voltage Vref-dcdc to control the voltage Vdcdc output from the DC-DC converter circuit 112 in order to dynamically control the headroom and maintain a fixed saturation margin for the power transistor 142.

The gate reference tracking circuit 220 includes a transistor 230 which is a scaled replica of the power transistor 142. The transistor 230 is accordingly a p-channel MOSFET device having a first (source) conduction terminal coupled, preferably connected, to the drain of the transistor 142. The transistor 230 is configured in diode-connected mode (i.e., trans-diode configuration) with its second (drain) conduction terminal coupled, preferably connected, to its gate. A current path of the gate reference tracking circuit 220 includes a first current source 232 that is coupled, preferably connected, in series with a resistor 234 that is coupled, preferably connected, in series with a second current source 236 between the supply node 140 and the reference node 122. A first terminal of the resistor 234 is coupled, preferably connected, to the first current source 232 and a second terminal of the resistor 234 is coupled, preferably connected, to the gate and drain of replica transistor 230 and the second current source 236. The first current source 232 sources a first current I1 equal to an offset current Ioff through the resistor 234 to the gate, drain of transistor 230. This offset current Ioff may be generated by applying a bandgap voltage across a resistor which of a same type as resistor 234 to have similar process and temperature variation. The second current source 236 sinks a second current I2 equal to the offset current Ioff plus a bias current Ib from the gate, drain of transistor 230. The bias current Ib is a current seed of the same type as the current Ioff that biases the transistor 230 to operate in the subthreshold region. The power transistor gate reference voltage Vref-g is output at an output node corresponding to the first terminal of the resistor 234. The resistor 234 is configured to have a variable or tunable resistance ($R_{OFFSET}$) used to program the desired headroom. The resistor 234 allow to introduce an offset which represents the saturation margin that the overall loop imposes on the LDO pass element transistor 142 (where the saturation margin is equal to Ioff*R.

The replica transistor 230 is biased by the current sources 232 and 236 in the subthreshold region and the output power transistor gate reference voltage Vref-g generated at the resistor 234 is given by the following equation:

$$V_{GATE}^{REF} \cong V_{LDO} - V_T + V_{OFFSET}$$

Where $V_{OFFSET}$ is the voltage drop across the tunable resistance $R_{OFFSET}$ for the resistor 234, $V_{LDO}$ is the output voltage Vldo of the regulator circuit 114, and $V_T$ is the threshold voltage of the diode connected replica transistor 230.

The replica transistor 230 provided in the trans-diode configuration, biased in the subthreshold region, and with its source connected to the drain of the power transistor 142, allows for the sensing of the threshold voltage of the power transistor 142. The resistor 234, biased by fixed current from the current sources and connected to the drain of the replica transistor 230, will generate the power transistor gate reference voltage Vref-g.

The reference voltage Vref-dcdc generating circuit 222 includes a differential amplifier 240 (for example, comprising an operational amplifier (OP-AMP) configured as an error amplifier) having a first, inverting, input coupled, preferably connected, to the gate of the power transistor 142 to receive the actual gate control voltage Vg of the power transistor 142, and a second, non-inverting, input coupled, preferably connected, to the output of the gate reference tracking circuit 220 to receive the power transistor gate reference voltage Vref-g. The differential amplifier 240 generates at its output a difference voltage Vdiff derived from a difference (i.e., error) between the gate reference voltage Vref-g and the actual gate control voltage Vg. This difference voltage Vdiff is stored across a capacitor C and low-pass filtered by an R-C filter circuit F. A voltage-to-current (V-to-I) conversion circuit 242 converts the difference voltage Vdiff to a current Idiff. A non-inverting operational amplifier circuit 246 includes a first, non-inverting, input coupled, preferably connected, to receive a fixed voltage Vfix which is generated from a bandgap voltage and represents the minimum output setpoint for the voltage Vdcdc that the control loop can impose at a no-load condition and a second, inverting, input coupled, preferably connected, to the current Idiff. The circuit 246 includes an operational amplifier (OP-AMP) with a feedback resistor R coupled, preferably connected, between the second, inverting, input and the output. The DC-DC converter reference voltage Vref-dcdc is generated at the output of the non-inverting operational amplifier circuit 246, with the voltage level at the output dependent on the fixed voltage Vfix at the input adjusted (in voltage shift) by the magnitude of the current Idiff flowing through the feedback resistor R.

In operation, the DC-DC converter circuit 112 responds to variation of the DC-DC converter reference voltage Vref-dcdc with a coherent movement of the output voltage Vdcdc, while the LDO regulator circuit 114 maintains the gate-to-source voltage Vgs of the power transistor 142 constant. The following equation applies:

$$Vrefdcdc = Vfix + R*(V2Igain)*(A_{240}\text{ gain})*(Vrefg - Vg)$$

where: Vrefdcdc=Vref_dcdc, R is the resistance of the feedback resistance for amplifier 246, V2Igain is the gain of the V-to-I converter circuit 242, $A_{240}$gain is the gain of the amplifier 240, and Vrefg=Vref_g.

In steady state, the gate voltage Vg equals the power transistor gate reference voltage Vref-g:

$$V_{PGATE} = V_{GATE}^{REF} = V_{LDO} - V_T + V_{OFFSET}$$

In this case:

$$V_{DG} = V_T - V_{OFFSET}$$

The voltage $V_{OFFSET}$ thus represents the fixed saturation margin which is adaptively set by the control loop according to operating conditions.

Figure 3B:
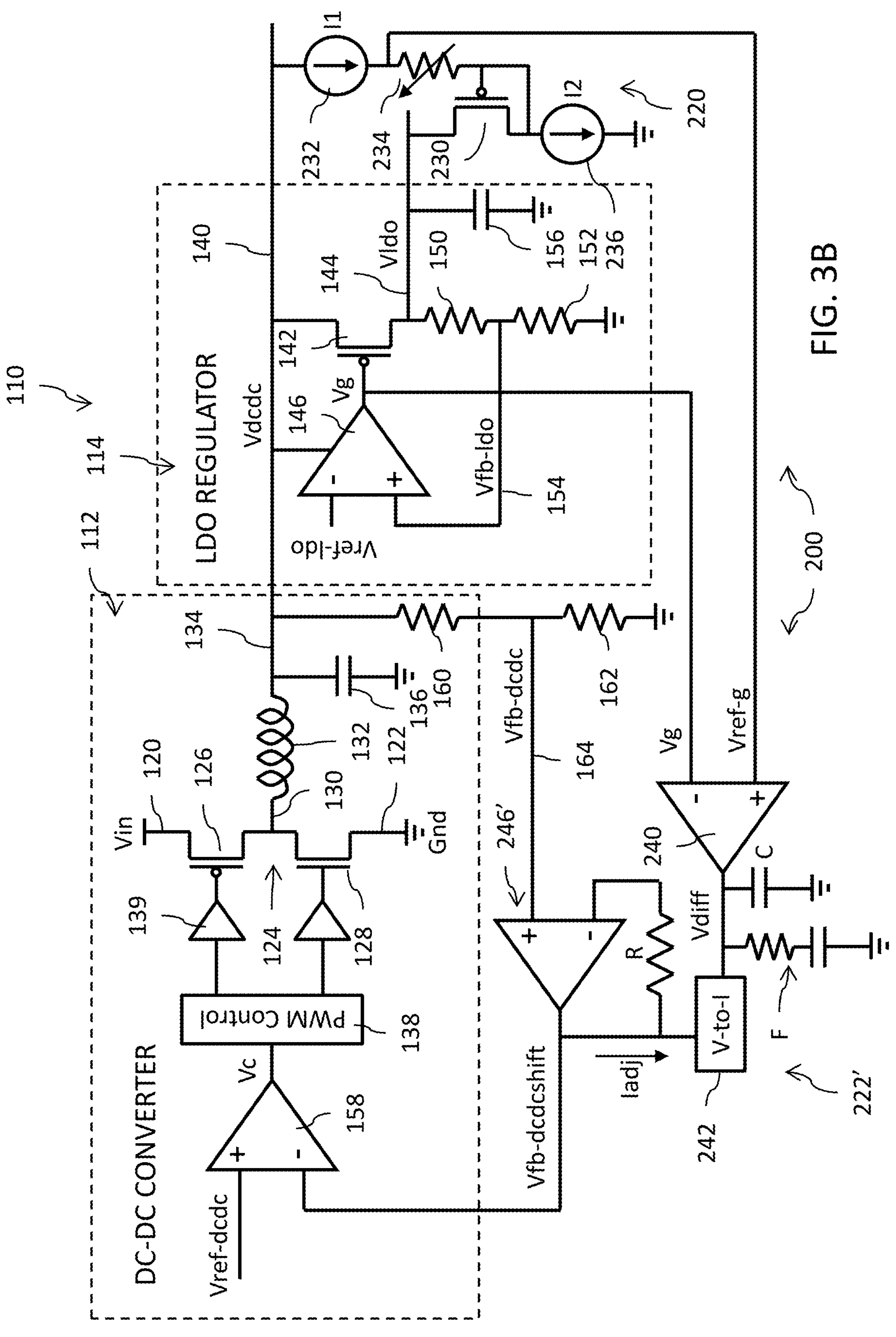
Figure 3C:
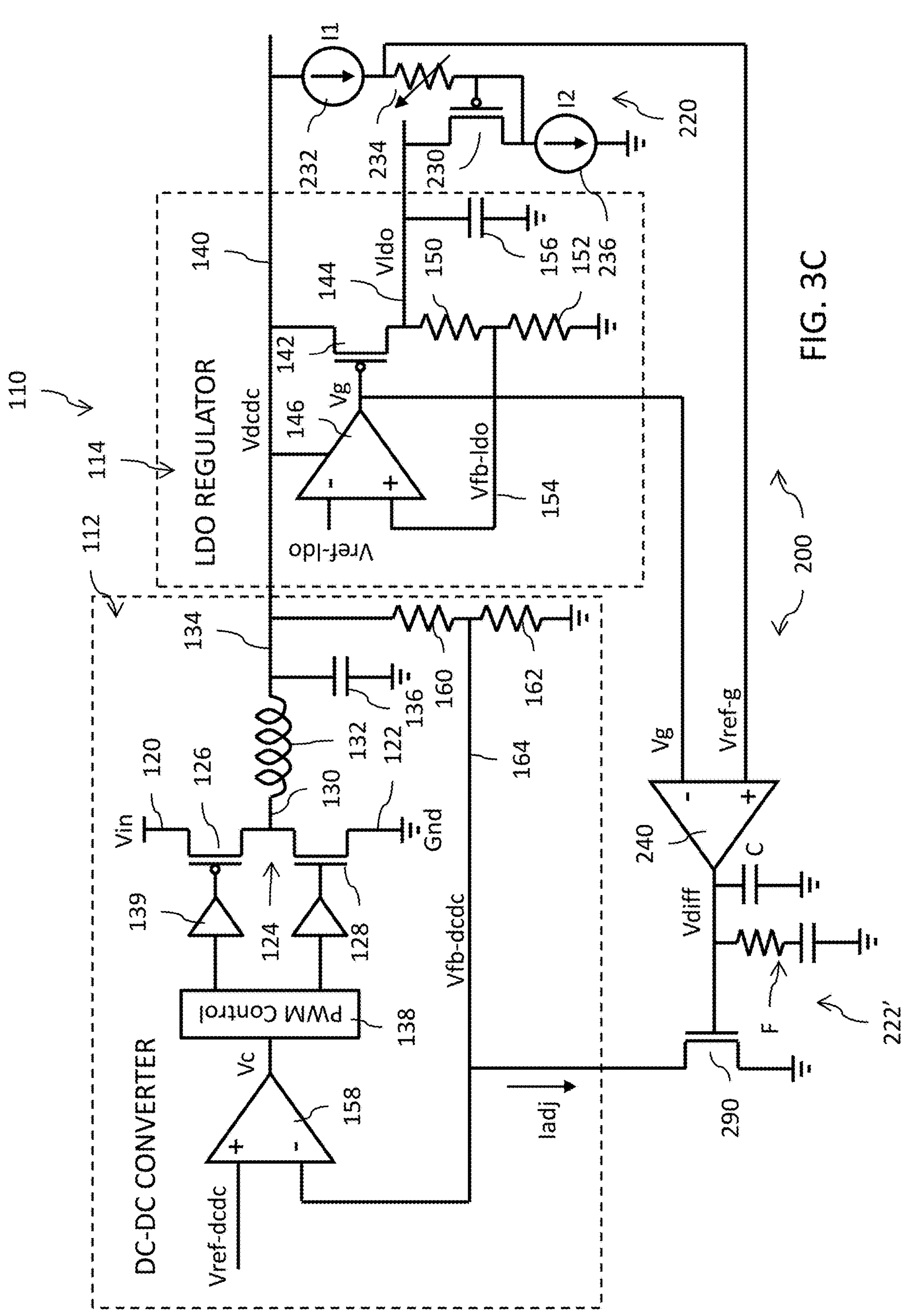

Reference is now made to FIGS. 3B and 3C. Like references in FIGS. 3A, 3B and 3C refer same or similar components. The circuits of FIGS. 3B and 3C differ from the circuit of FIG. 3A in the following ways:

- the DC-DC converter reference voltage Vref-dcdc is a fixed voltage generated from a bandgap voltage.
- the DC-DC converter reference voltage Vref-dcdc generating circuit 222 of the headroom control circuit 200 is replaced with a DC-DC converter feedback voltage adjustment circuit 222' that generates a current Iadj based on an error difference between the gate voltage Vg and gate reference voltage Vref-g that is injected into (for example, sunk from) the feedback loop to adjust (or tune or shift) the feedback voltage Vfd-dcdc to control the voltage Vdcdc output from the DC-DC converter circuit 112 in order to dynamically control the headroom and maintain a fixed saturation margin for the power transistor 142.

The circuit 222' of FIG. 3B includes amplifier 246' having a non-inverting input configured to receive the feedback voltage Vfd-dcdc from the resistive voltage divider circuit 160, 162. An inverting input of amplifier 246' is coupled to the output of amplifier 246' by a feedback resistor R, with this amplifier circuit functioning as a buffer circuit. The output of amplifier 246' is coupled to the inverting input of amplifier 158 and to the voltage-to-current converter 242 which sinks an adjustment current Iadj from the output of the amplifier 246' which is dependent on the difference between the voltages Vref_g and Vg in order to modulate the feedback voltage Vfd-dcdc.

The circuit 22' in FIG. 3C includes a transistor (for example, an n-channel MOSFET) 290 having a first conduction terminal (drain) coupled to the feedback line between the resistive voltage divider 160, 162 and the inverting input of amplifier 158, a second conduction terminal (source) coupled to the reference node 122, and a control (gate) biased by the voltage Vdiff. This transistor 290 functions as a form of a voltage-to-current converter circuit for converting the voltage Vdiff to the adjustment current Iadj. The conductivity of transistor 290 is modulated by the voltage Vdiff to sink the adjustment current Iadj from the output of the amplifier 246', where current Iadj is dependent on the difference between the voltages Vref_g and Vg in order to modulate the feedback voltage Vfd-dcdc.

Figure 3D:
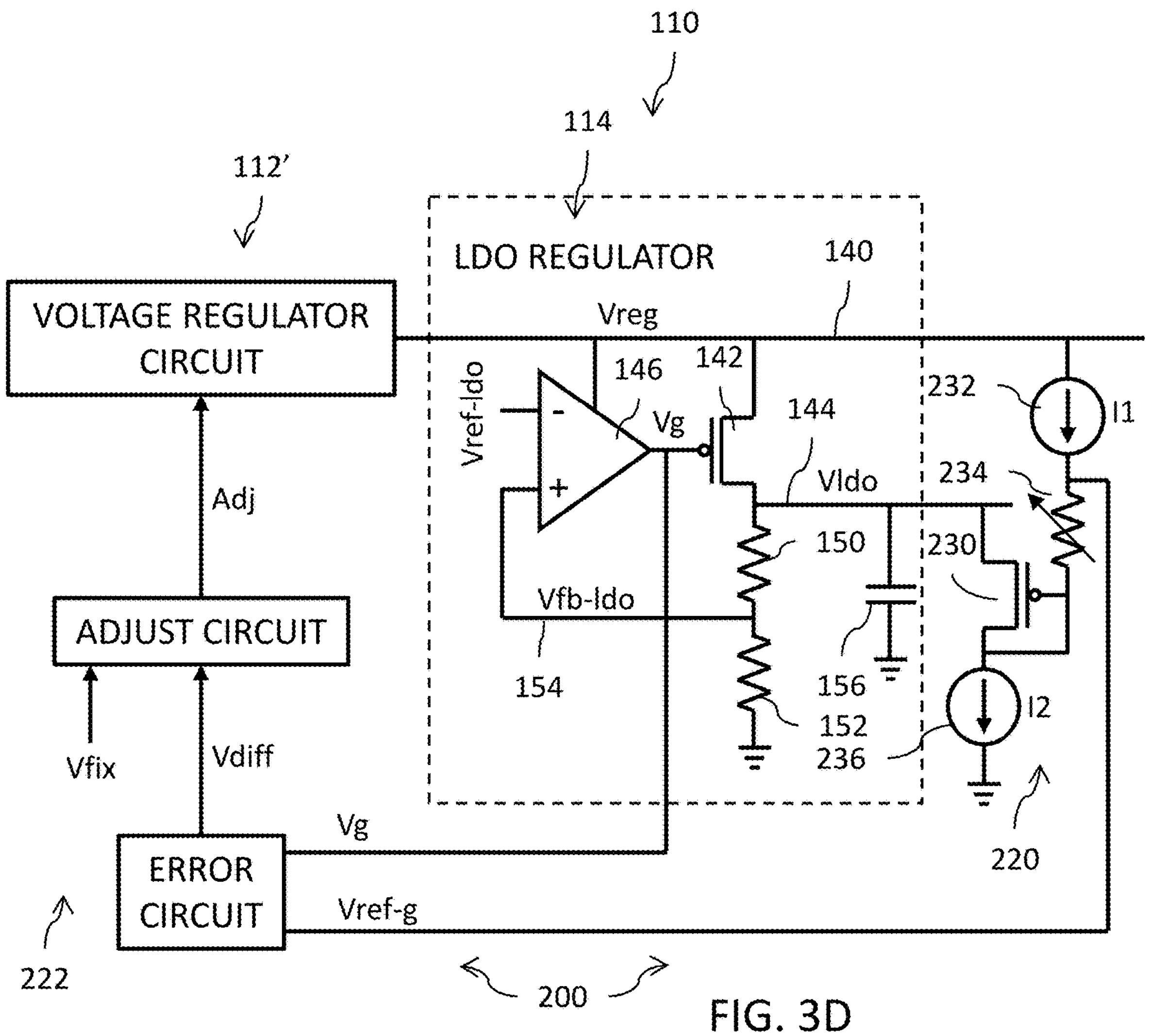

Reference is now made to FIG. 3D which shows a more general embodiment of the implementation shown in FIGS. 3A and 3B. Here, the DC-DC converter 112 is replaced by any suitable voltage regulation circuit 112' (such as, for example, an AC-DC converter, a charge pump circuit, a linear regulator circuit, etc.) that has a control input configured to effectuate a tuning of the regulated output voltage Vreg. The gate voltage Vg and gate reference voltage Vref-g are applied as inputs to an error circuit that generates an output difference signal Vdiff indicative of a difference between those voltages. An adjust circuit receives the difference signal Vdiff and the fixed voltage Vfix and generates an adjustment signal Adj that is applied to the control input of the voltage regulation circuit 112' to control the level of the regulated output voltage Vreg to dynamically adjust the headroom and maintain a fixed saturation margin for the power transistor 142 of the LDO regulator 114.

Figure 4A:
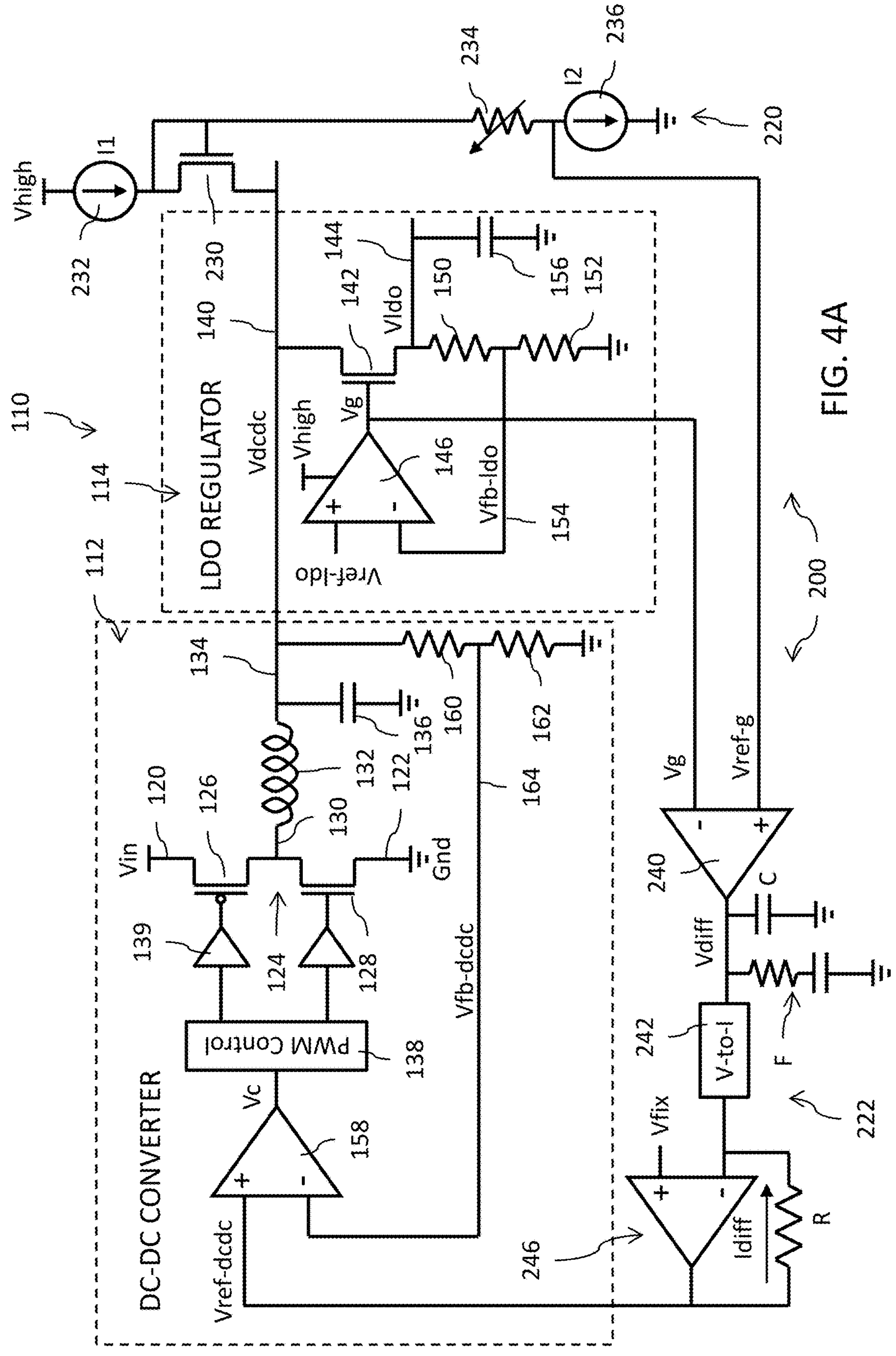
FIGS. 4A-4B show circuit diagrams for embodiments of a tandem LDO circuit including a voltage regulator circuit, an n-channel power MOSFET based LDO regulator circuit and a headroom control circuit.

Reference is now made to FIG. 4A. Like references in FIGS. 3A and 4A refer same or similar components. The circuit of FIG. 4A differs from the circuit of FIG. 3A in the following ways:

- the LDO regulator circuit 114 uses an n-channel MOSFET for the power transistor 142. In this configuration, the drain of transistor 142 is coupled, preferably connected, to the supply node 140 and the source of transistor 142 is coupled, preferably connected, to the output node 144. Furthermore, the inverting and non-inverting inputs of the amplifier 146 are swapped, with the reference voltage Vref-lda applied to the non-inverting input and the feedback voltage Vfb-ldo applied to the inverting input. Additionally, the amplifier 146 is powered from a voltage Vhigh supply node (higher than Vdcdc).
- the gate reference tracking circuit 220 includes a transistor 230 which is a scaled replica of the power transistor 142. The transistor 230 is accordingly an n-channel MOSFET device having a first (source) conduction terminal coupled, preferably connected, to the drain of the transistor 142 at output node 140. The transistor 230 is configured in diode-connected mode with its second (drain) conduction terminal coupled, preferably connected, to its gate. A current path of the gate reference tracking circuit 220 includes a first current source 232 is coupled, preferably connected, in series with a resistor 234 that is coupled, preferably connected, in series with a second current source 236 between the high voltage Vhigh supply node and the reference node 122. A first terminal of the resistor 234 is coupled, preferably connected to the gate and drain of replica transistor 230 and the first current source 232 and a second terminal of the resistor 234 is coupled, preferably connected, to the second current source 236. The first current source 232 sources a first current I1 equal to an offset current Ioff plus a bias current Ib to the gate, drain of transistor 230 and through the resistor 234. The second current source 236 sinks a second current I2 equal to the offset current Ioff from resistor 234. The power transistor gate reference voltage Vref-g is output at an output node corresponding to the second terminal of the resistor 234. The resistor 234 is configured to have a variable or tunable resistance ($R_{OFFSET}$) used to program the desired headroom.

The circuit of FIG. 4A may be modified in a manner like that shown in FIGS. 3B and 3C using circuit 222' to instead effectuate modulated control over the feedback voltage Vfb-dcdc. In these configurations, the DC-DC converter reference voltage Vref-dcdc is a fixed voltage generated from a bandgap voltage. The circuit 222' would generate a current Iadj based on an error difference between the gate voltage Vg and gate reference voltage Vref-g that is injected into the feedback loop to adjust (or tune or shift) the feedback voltage Vfd-dcdc to control the voltage Vdcdc output from the DC-DC converter circuit 112 in order to dynamically control the headroom and maintain a fixed saturation margin for the power transistor 142.

Figure 4B:
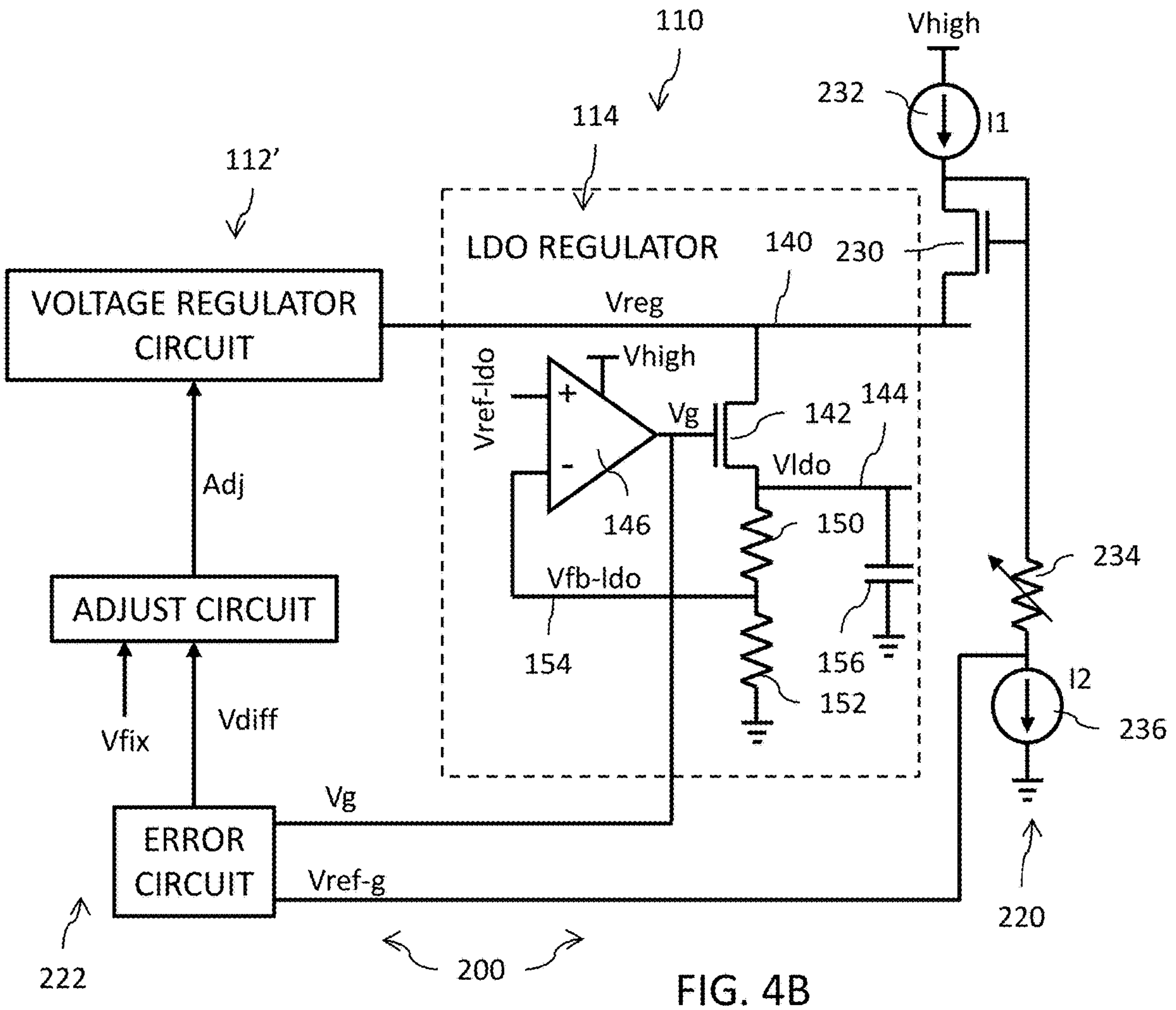

Reference is now made to FIG. 4B which shows a more general embodiment of the implementation shown in FIG. 4A. Here, the DC-DC converter 112 is replaced by any suitable voltage regulation circuit 112' (such as, for example, an AC-DC converter, a charge pump circuit, a linear regulator circuit, etc.) that has a control input configured to effectuate a tuning of the regulated output voltage Vreg. The gate voltage Vg and gate reference voltage Vref-g are applied as inputs to an error circuit that generates an output difference signal Vdiff indicative of a difference between those voltages. An adjust circuit receives the difference signal Vdiff and the fixed voltage Vfix and generates an adjustment signal Adj that is applied to the control input of the voltage regulation circuit 112' to control the level of the regulated output voltage Vreg to dynamically adjust the headroom and maintain a fixed saturation margin for the power transistor 142 of the LDO regulator 114.

The circuits of FIGS. 3A-3C and 4A-4B function to adaptively change the headroom of the LDO regulator 114. The headroom is dynamically adjusted in order to optimize PSR and to guarantee that the power transistor 142 is always working in the saturation region with a fixed saturation margin. Efficiency of the LDO regulator is optimized by the loop control since the loop will function to set the proper headroom for a current carried by the LDO regulator. The circuit is further fully integratable as no off-chip components are needed to support the headroom control functionality.

The headroom control solution herein is further applicable regardless of the DC-DC converter topology. The DC-DC converter may, for example, utilize a buck topology, a boost topology, a buck-boost topology, or an inverting buck-boost topology. The DC-DC converter topology shown in FIGS. 3A-3C and 4A is provided as a non-limiting example only.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A circuit, comprising:

a voltage regulator circuit receiving a supply voltage and an adjustable control signal to generate a DC supply voltage from the supply voltage as a function of the adjustable control signal;

a low dropout (LDO) regulator circuit receiving the DC supply voltage and a first reference voltage to generate a regulated output voltage from the DC supply voltage as a function of the first reference voltage;

wherein the LDO regulator circuit includes a power transistor having a drain where the regulated output voltage is generated and a gate that receives a gate voltage; and a headroom control circuit comprising:

a replica transistor in a trans-diode configuration, wherein the replica transistor is a scaled replica of the power transistor, the replica transistor having a source coupled to the drain of the power transistor;

a resistor connected to a drain of the replica transistor and biased by a bias current to generate a gate reference voltage; and a control signal generator circuit configured to generate the adjustable control signal as a function of a difference between the gate voltage and the gate reference voltage.

2. The circuit of claim 1, wherein the voltage regulator circuit is a DC-DC converter circuit having a topology selected from the group consisting of: a buck topology, a boost topology, a buck-boost topology, or an inverting buck-boost topology.

3. The circuit of claim 1, wherein the voltage regulator circuit is selected from the group consisting of: an AC-DC converter circuit, a charge pump circuit, or a linear regulator circuit.

4. The circuit of claim 1, wherein the adjustable control signal is an adjustable second reference voltage for the voltage regulator circuit and the control signal generator circuit comprises:

an error amplifier having a first input configured to receive the gate voltage and a second input configured to receive the gate reference voltage;

a voltage-to-current converter circuit configured to convert a difference voltage at an output of the error amplifier to a difference current; and an operational amplifier circuit having a first input configured to receive a fixed voltage, a second input configured to receive the difference current and a feedback resistor coupled between the second input and an output of the operational amplifier circuit where the adjustable second reference voltage is generated.

5. The circuit of claim 1, wherein the adjustable control signal is an adjustable current applied to a feedback loop of the voltage regulator circuit and the control signal generator circuit comprises:

an error amplifier having a first input configured to receive the gate voltage and a second input configured to receive the gate reference voltage; and a voltage-to-current converter circuit configured to convert a difference voltage at an output of the error amplifier to a difference current which is applied as the adjustable current for the adjustable control signal.

6. The circuit of claim 5, wherein the voltage-to-current converter circuit comprises a MOSFET transistor having a source-drain connection to the feedback loop of the voltage regulator circuit and a gate biased by the output of the error amplifier.

7. The circuit of claim 5, further comprising an operational amplifier circuit having a first input configured to receive a voltage derived from the DC supply voltage, a second input coupled to an output of the operational amplifier circuit and wherein the output of the operational amplifier circuit is coupled to an output of the voltage-to-current converter circuit and the feedback loop of the voltage regulator circuit.

8. The circuit of claim 1, wherein the power transistor is a p-channel MOSFET and wherein the replica transistor is a p-channel MOSFET.

9. The circuit of claim 1, wherein the power transistor is an n-channel MOSFET and wherein the replica transistor is an n-channel MOSFET.

10. The circuit of claim 1, wherein the headroom control circuit further comprises:

a first current source configured to source a first current through the resistor to a gate and the drain of the replica transistor; and a second current source configured to sink a second current from the gate and the drain of the replica transistor.

11. The circuit of claim 10, wherein the second current is larger than the first current.

12. The circuit of claim 1, wherein the headroom control circuit further comprises:

a first current source configured to source a first current to a gate and the drain of the replica transistor; and a second current source configured to sink a second current through the resistor from the gate and the drain of the replica transistor.

13. The circuit of claim 12, wherein the first current is larger than the second current.

14. The circuit of claim 1, wherein the resistor of the headroom control circuit is adjustable.

15. A circuit, comprising:

a voltage regulator circuit receiving a supply voltage and an adjustable control signal to generate a DC supply voltage from the supply voltage as a function of the adjustable control signal;

a low dropout (LDO) regulator circuit receiving the DC supply voltage and a first reference voltage to generate a regulated output voltage from the DC supply voltage as a function of the first reference voltage;

wherein the LDO regulator circuit includes a power transistor having a drain where the regulated output voltage is generated and a gate that receives a gate voltage; and a headroom control circuit including a gate reference tracking circuit configured to generate from the regulated output voltage of the LDO regulator circuit a gate reference voltage for the power transistor and an adjustment circuit configured to compare the gate voltage to the gate reference voltage and generate the adjustable control signal as a function of a difference between the gate voltage and the gate reference voltage.

16. The circuit of claim 15, wherein the gate reference tracking circuit comprises:

a replica transistor in a trans-diode configuration, wherein the replica transistor is a scaled replica of the power transistor, the replica transistor having a source coupled to the drain of the power transistor; and a resistor connected to a drain of the replica transistor and biased by a bias current to generate the gate reference voltage.

17. The circuit of claim 16, wherein the adjustable control signal is an adjustable second reference voltage for the voltage regulator circuit.

18. The circuit of claim 16, wherein the adjustable control signal is an adjustable current applied to a feedback loop of the voltage regulator circuit.

* * * * *